United States Patent [19]

Kitagawa et al.

[11] Patent Number: 5,764,270
[45] Date of Patent: Jun. 9, 1998

[54] IMAGE FORMING APPARATUS WITH A PLURALITY OF IMAGE FORMING UNITS

[75] Inventors: Shunji Kitagawa; Kouichi Takemura; Masahide Ishigami; Satoru Kobayashi; Takao Sugano; Mitsuaki Takeguchi; Kiyoshi Shimada, all of Kawasaki, Japan

[73] Assignee: Fujitsu Limited, Kawasaki, Japan

[21] Appl. No.: 603,094

[22] Filed: Feb. 20, 1996

Related U.S. Application Data

[63] Continuation of Ser. No. 358,731, Dec. 19, 1994, abandoned.

[30] Foreign Application Priority Data

Mar. 15, 1994 [JP] Japan .................................. 6-044393

[51] Int. Cl.[6] .................... B41J 2/47; B41J 2/435; G11B 7/00; H04N 1/23
[52] U.S. Cl. ........................ 347/234; 347/237; 347/343
[58] Field of Search ......................... 347/118, 247, 347/237, 234, 235, 243, 244, 255, 259, 260, 261; 327/522

[56] References Cited

U.S. PATENT DOCUMENTS 4,906,874  3/1990  Fuji et al. ............................. 327/552
5,072,244  12/1991  Aoki et al. ........................... 347/118

FOREIGN PATENT DOCUMENTS

| 60-48052 | 3/1985 | Japan . |
|---|---|---|
| 62-242909 | 10/1987 | Japan . |
| 62-251714 | 11/1987 | Japan . |
| 62-287270 | 12/1987 | Japan . |
| 63-73276 | 4/1988 | Japan . |
| 3-271711 | 12/1991 | Japan . |
| 4-4568 | 1/1992 | Japan . |
| 4-195071 | 7/1992 | Japan . |

*Primary Examiner*—N. Le
*Assistant Examiner*—Raquel Yvette Gordon
*Attorney, Agent, or Firm*—Armstrong Westerman, Hattori, McLeland & Naughton

[57] ABSTRACT

A light scanning controller includes a plurality of light scanning parts for forming a latent image on a photoconductor by irradiating it with a scanning laser beam, and a clock controller for generating a timing signal by using a single clock signal obtained from a master clock oscillator to transmit the timing signal to each of the light scanning parts which controls the timing of the scanning laser beam on the basis of the timing signal received from the clock controller.

11 Claims, 11 Drawing Sheets

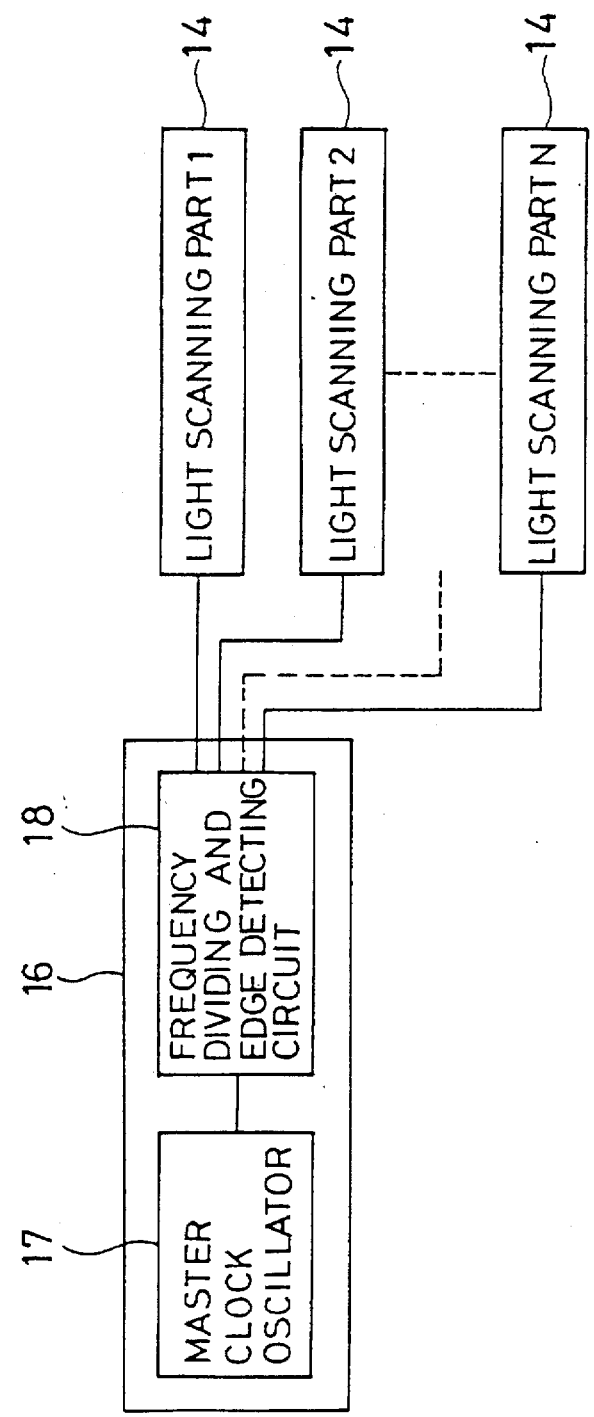
F I G. 4

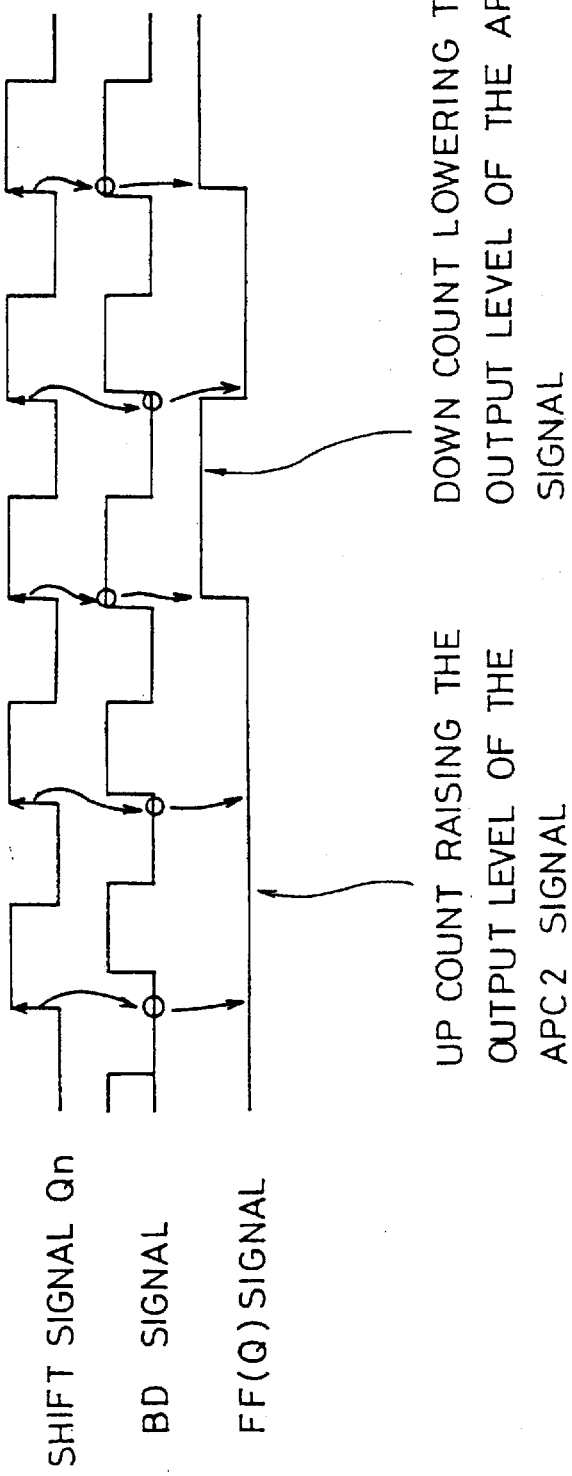

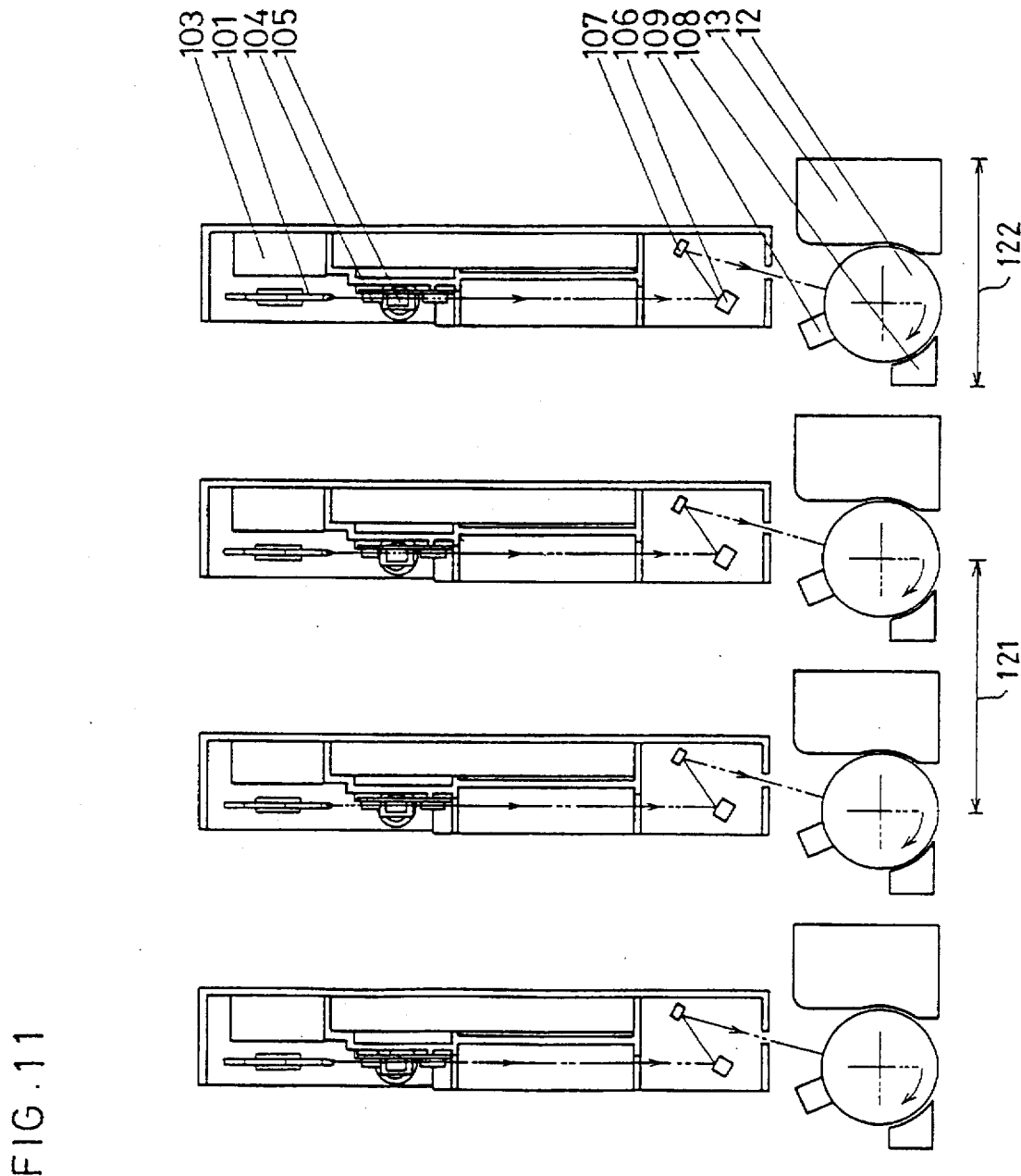

IMAGE FORMING APPARATUS WITH A PLURALITY OF IMAGE FORMING UNITS

This is a continuation of application Ser. No. 08/358,731 filed Dec. 19, 1994, now abandoned.

BACKGROUND OF THE INVENTION

1. Field of the Invention

The present invention relates to light scanning controllers, and more specifically to a light scanning controller for use in laser printers such as a color printing laser printer that can form multicolored images, the light scanning controller controlling the timing of light scanning of a scanning laser beam with which a photoconductor is irradiated to form the multicolored images.

2. Description of the Related Art

With computer systems providing a higher Performance in recent years, a color printing function is demanded in laser printers. A color printing laser printer will be described hereinbelow as an example of such laser printers.

When the color printing laser printer uses, for example, a polygon mirror for each of the original colors, original image information is divided into image information components for each of the original colors so that each of the polygon mirrors for original colors reflects a laser beam which is modulated on the basis of these divided image information components to irradiate a photosensitive drum with the laser beam serving as a scanning laser beam for each of the original colors. Then, a static latent image formed and obtained on the photosensitive drum is developed to form a color image. In such a case, allowing the image position of each of the original colors to agree with each other requires a highly accurate control of the revolution of the polygon mirror motor for each of the original colors, and the printing of characters free from color shift.

Since single color printing laser printers use only one polygon mirror, such printers do not require a highly accurate control of the revolution of the polygon mirror motor. In other words, in such single color printing laser printer, an electrical signal referred to as an FG pulse is used to control the revolution of the polygon mirror motor. The FG pulse is generated once every time the polygon mirror motor revolves once. In addition, the revolution of the polygon mirror motor is controlled by comparing the electric signal with the standard pulse of the crystal oscillator. In principle, the revolution number of the motor is controlled.

In contrast, it is required that the image position of each of the original colors is allowed to agree with each other for color printing laser printers. In other words, it is required that the image position of each of the original colors be allowed to completely agree with each other for each of the scanning operations of the laser beam in color printing laser printers. When the timing of the laser beam scanning is not adjusted, images transcribed and synthesized on paper are shifted in position.

Thus, in the color printing laser printer using a plurality of polygon mirrors, the plurality of polygon mirrors are revolved at the same revolution rate whereas the revolution phase thereof is finely adjusted lest the position of the image for each of the original colors be shifted.

In the related art an image recording apparatus is known which is described in Japanese Published Unexamined Patent Application No. SHO 60-48052, the apparatus comprising a plurality of image recording parts, a paper feeding part having a selectable feeding channel, and a main body controller having a single standard signal generating part; wherein the plurality of the image recording parts and the paper feeding part have revolution driving sources peculiar to respective parts, a group of the revolution driving sources being constituted in such a manner that the revolution driving sources are controlled together with the standard signal generating part in the feedback operation, thereby accurately controlling the output of each revolution at low cost.

A laser beam printer as described in Japanese Published Unexamined Patent Application No. SHO 62-242909 can output a clear color image with a well-balanced color tone by providing a common oscillation source of a standard frequency signal supplied to a phase locked loop (PLL) IC chip.

Japanese Published Unexamined Patent Application No. SHO 62-251714 also describes a laser beam printer in which the phase of each surface of the plurality of polygon mirrors is allowed to agree with each other whereas the transmission timing of the beam detection signal is allowed to agree with each other thereby forming a high-quality color image free from color shift.

As still another known apparatus, Japanese Published Unexamined Patent Application No. SHO 62-287270 describes a digital color copying machine in which a signal generation timing for image writing is generated so that the timing is least affected by a variation in the revolution speed of a photoconductor and a transcription belt to correctly overlap cyan, magenta, yellow and black color images.

As still another known apparatus, Japanese Published Unexamined Patent Application No. SHO 63-73276 describes a laser printer in which a plurality of recording heads irradiate each of photoconductors with a laser beam to form an image and to provide a high-quality color printing free from any color shift by eliminating a shift in the position of printing dots in transcription on the same transcription paper.

Furthermore, Japanese Published Unexamined Patent Application No. HEI 3-271711 describes, as a known device, a surface phase synchronizing circuit of a polygon mirror that assures the synchronization of scanning lines in a plurality of exposing apparatus.

A scanning method described in Japanese Published Patent Application No. HEI 4-4568 is known which allows the phase between a plurality of scanning lines by the optical system of rotating polygon mirrors to agree with each other and can adjust the freedom of the arrangement of optical systems sufficiently largely and independently.

Still furthermore, Japanese Published Unexamined Patent Application No. HEI 4-195071 describes, as a known apparatus, an image forming apparatus that can form an image free from any color shift even when a multiple transcription is performed for each of a plurality of colors thereby providing a high-quality color image free from any color shift.

SUMMARY OF THE INVENTION

The present invention provides a light scanning controller for allowing the image position of each of the original colors to agree with each other by controlling the timing of the light scanning of each scanning laser beam with a single clock signal.

According to the present invention, it provides a light scanning controller comprising:

- a plurality of light scanning parts for forming a latent image on a photoconductor by irradiating it with a scanning laser beam; and a clock controller for generating a timing signal by using a single clock signal obtained from a master clock oscillator to transmit the timing signal to each of the light scanning parts which controls the timing of the scanning laser beam on the basis of the timing signal received from the clock controller.

BRIEF DESCRIPTION OF THE DRAWINGS

The present invention will be described in detail with reference to the accompanying drawings in which:

FIG. 4 is a block diagram showing a structure of a clock controller according to the present invention;

FIG. 10 is a timing chart showing the timing of the signal of the second PLL circuit according to the present invention; and FIG. 11 is a view showing another example of the structure of a color printing laser printer to which the present invention is applied.

DESCRIPTION OF THE PREFERRED EMBODIMENT

Figure 1:
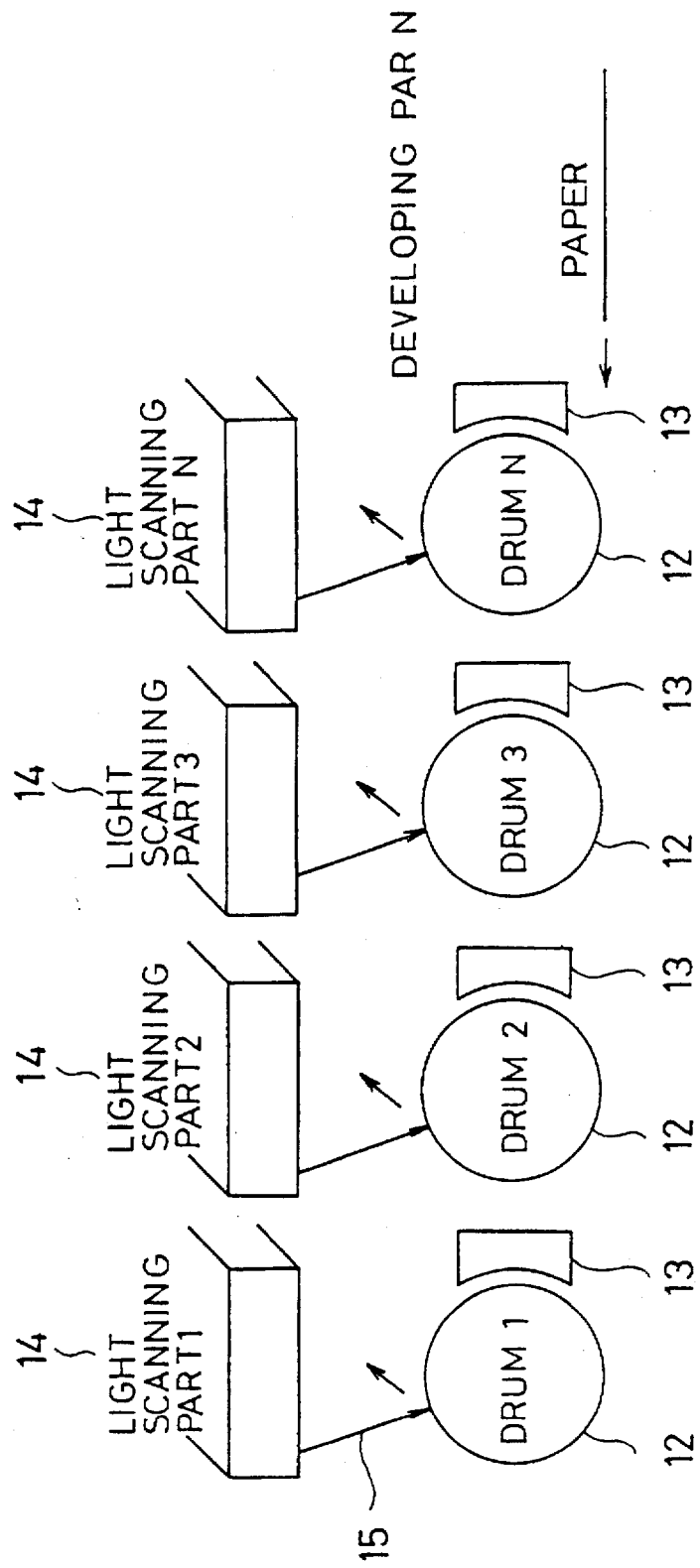
FIG. 1 is a view illustrating a basic structure of one embodiment according to the present invention.

In the present invention, a photoconductor may be of any type as long as it can form a latent image with a received scanning laser beam and can form a color image. As the latent image, a static lament image is usually used. The photoconductor may be formed of a single photoconductor or a plurality of photoconductors.

When a multicolored image is formed, the plurality of photoconductors are provided in a number corresponding to the number of original colors used for forming the multicolored image. Consequently, in the formation of the multicolored image, as the photoconductors, preferably three types of photoconductors are used which correspond to original colors of cyan, magenta and yellow, or four types of photo-conductors corresponding to the above three original colors plus black color. The photoconductors used therein are coated on the surface and may be any configuration such as drum-like and belt-like configurations.

Light scanning parts irradiate the photoconductors with the scanning laser beam. The number of light scanning parts provided in the laser printer corresponds to the number of the types of images that are synthesized. Images to be synthesized may be of the same color or may be of different colors. When images to be synthesized are of different colors, the light scanning parts are usually provided in the number corresponding to the number of each original colors for forming multicolored images. Consequently, the light scanning parts comprise four components corresponding to the photoconductors, respectively. As the light scanning laser beam with which the photoconductor is irradiated, a laser beam generated by a semiconductor laser is usually used. However, the laser beam is not limited to any specific type.

In the present invention, a clock controller obtains a single clock signal from a master clock oscillator. The clock controller may be constituted so that it incorporates a master clock oscillator for outputting the single clock signal. Otherwise, the clock controller may be constituted so that the controller receives the signal clock from the outside master clock oscillator- Each type of oscillator may be used as a master clock oscillator. Preferably, a crystal oscillator is used for the accuracy thereof.

The clock controller generates a timing signal by using a single clock signal. Preferably, the timing signal comprises a master clock signal generated by the single clock signal obtained by the master clock oscillator, an original signal obtained by frequency dividing the master clock signal, and an edge signal for controlling the phase of the original signal. The clock controller usually comprises a counter and a logic circuit.

In this manner, the phase of the original signal can be shifted to a variable position from an edge signal by forming the edge signal.

In the present invention, each of the light scanning parts preferably includes a counter. In the control of the timing of the scanning laser beam, the counter value of each counter is set in accordance with the image position formed by each of the light scanning parts, and a shift signal is obtained by shifting the original signal received by the clock controller from the edge signal thereby controlling the timing of each of the scanning laser beams on the basis of the shift signal.

In this manner, when the shift signal is obtained by shifting the original signal from the edge signal by a count value of the counter, the shift signal can be easily obtained which is shifted in accordance with the shift in the position of images by modifying the preset value of the counter.

Each of the light scanning parts preferably includes an optical unit comprising a polygon mirror which is rotated by the motor and reflects the scanning laser beam. Preferably, each of the light scanning parts is constituted so that the adjustment of the revolution of the motor allows controlling the timing of the scanning laser beam thereby adjusting a shift in the position of the image formed by each of the light scanning parts. Such structure of the light scanning parts enables the adjustment of the shift in the position of the image formed by each of the light scanning parts. As the motor, a motor can be used which can output a hole signal for the revolution control.

Each of the light scanning parts preferably comprises an optical sensor for detecting the scanning laser beam reflected by the polygon mirror. The signal detected by the optical sensor is preferably used as a writing signal formed on each of the photoconductors and as a signal for controlling the timing of the scanning laser beam.

The optical sensor is conventionally known and usually used in the laser printer. Using the signal of this optical sensor as a signal for controlling the timing of the scanning laser beam eliminates the need of a special apparatus for controlling the timing of the scanning laser beam.

Each of the light scanning parts is preferably constituted so as to adjust the revolution of the motor at two steps; the step of controlling the revolution number of the motor and the step of controlling the revolution phase of the motor. In such a case, still more preferably, the revolution number control signal synchronizes the revolution number of the motor by comparing the hole signal obtained from the motor with the revolution number control signal followed by synchronizing the revolution phase of the motor with the shift signal by comparing the signal of the scanning laser beam with the shift signal.

Such construction allows highly accurately controlling the revolution of the motor in a short time.

In such a case, each of the light scanning parts is so constituted as to include one PLL circuit to which either the shift signal or the revolution number control signal obtained by frequency dividing the shift signal so that the hole signal obtained from the motor is input along with the input of the revolution number control signal to control the revolution number of the motor in accordance with the difference in frequency or the revolution number between the two signals whereas the signal of the scanning laser beam detected by the optical sensor is input along with the input of the shift signal to control the revolution phase of the motor in accordance with the phase difference between these two signals.

Such construction of the light scanning parts enables controlling the revolution of the motor only by using one PLL circuit.

Furthermore, each of the light scanning parts includes two PLL circuits so that the revolution number control signal obtained by frequency dividing the shift signal and the hole signal obtained from the motor are input to the first PLL circuit for controlling the revolution number of the motor in accordance with the difference in the frequency or the revolution number between the two signals whereas the shift signal and the light scanning signal detected by the optical sensor are input to the second PLL circuit, thereby controlling the revolution phase of the motor in accordance with the phase difference between these two signals. In such a case, the second PLL circuit usually comprises a counter, a flip-flop and a digital-analog converter.

Such construction uses two PLL circuits thereby enabling more accurate control of the printer.

In this particular invention, the light scanning part comprises components, the number of the components corresponding to each of the original colors. Preferably, the photoconductor comprises components, the number of the components corresponding to the number of the light scanning parts.

In accordance with the present invention, the timing is generated by using the single master clock signal obtained from the master clock oscillator to control the timing of the scanning laser beam in each light scanning part on the basis of the timing signal. Consequently, the standard for the position of the image formed by each light scanning part 14 is matched with the result that the image position can be adjusted in accordance with each of the light scanning parts, thereby enabling matching the image position highly accurately.

Preferably, the light scanning controller of the present invention is incorporated in an apparatus for forming multicolored images in practical use. Such apparatus for forming multicolored images can be applied to a color copying machine, color facsimile and color printing laser printer.

This apparatus for forming multicolored images preferably comprises photoconductors in the number corresponding to the number of light scanning parts and a developing part provided in correspondence to each of the photoconductors to develop a latent image formed therein. Then, each of the light scanning parts in this apparatus for forming multicolored images is preferably constituted so that a plurality of original color information items are divided into image information items corresponding to each of the original colors, whereby thus divided information is delayed in accordance with the transcription period, a laser beam is modulated in accordance with the transcription period, and the modulated laser beam is reflected by the polygon mirror to be output as the scanning laser beam. In this case, paper is preferably conveyed along the photoconductors. Such construction allows the formation of multicolored images.

Preferably, the apparatus for forming multicolored images comprises an approximately L-shaped or reverse L-shaped optical unit, the optical unit having a frame provided with a recessed portion so that part of other optical units is telescopically arranged. This allows the reduction in a process pitch generated at the time of the conveyance of paper from a photoconductor to the subsequent photoconductor in a size to a level smaller than one process module in the optical unit.

In addition, when the rotation shaft of the polygon mirror is arranged approximately in parallel relative to the direction in which paper is conveyed, the process module can be reduced in size to a level smaller than the process pitch generated when paper is conveyed from a photoconductor to the subsequent photoconductor.

The present invention will be detailed in conjunction with the accompanying drawings, but they are not intended to limit the scope of the present invention.

FIG. 1 is an explanatory view showing a basic structure of one embodiment of the present invention, the view exemplifying a case in which the light scanning controller of the present invention is applied to a color printing laser printer.

Referring to FIG. 1, reference numeral 12 designates a photosensitive drum (photoconductor) formed into a cylindrical configuration whose surface is coated with the photoconductive material. Then, when the cylindrical surface is irradiated with the laser beam, a static latent image can be formed. The Photosensitive drum 12 comprises N photosensitive drums comprising a drum 1, a drum 2, - - - , a drum N (N is a natural number).

In normal color printing, the photosensitive drum 12 includes four photosensitive drum components for three original colors such as cyan, magenta and yellow, plus black color, the drum components being arranged in the order of transcription. However, in the present invention, since it is possible to arrange the photosensitive drum components in a voluntary number, the number is designated by a symbol N. In the foregoing passage, N designates a voluntary number of colors that can be arranged in correspondence to N number photosensitive drum 12.

Each component of the photosensitive drum 12 provides N developing parts comprising a development parts numbered 1 through N. When images are printed in a plurality of colors, the paper is conveyed in the direction designated by an arrow in FIG. 1.

Reference numeral 14 designate a light scanning part For irradiating each photosensitive drum 12 with the scanning laser beam 15. The light scanning part 14 comprises N components ranging from light scanning part component 1 through light scanning part component N. The light scanning part controls the timing of the scanning laser beam 15 on the basis of the timing signal received by the clock controller that will be described later.

Figure 2:
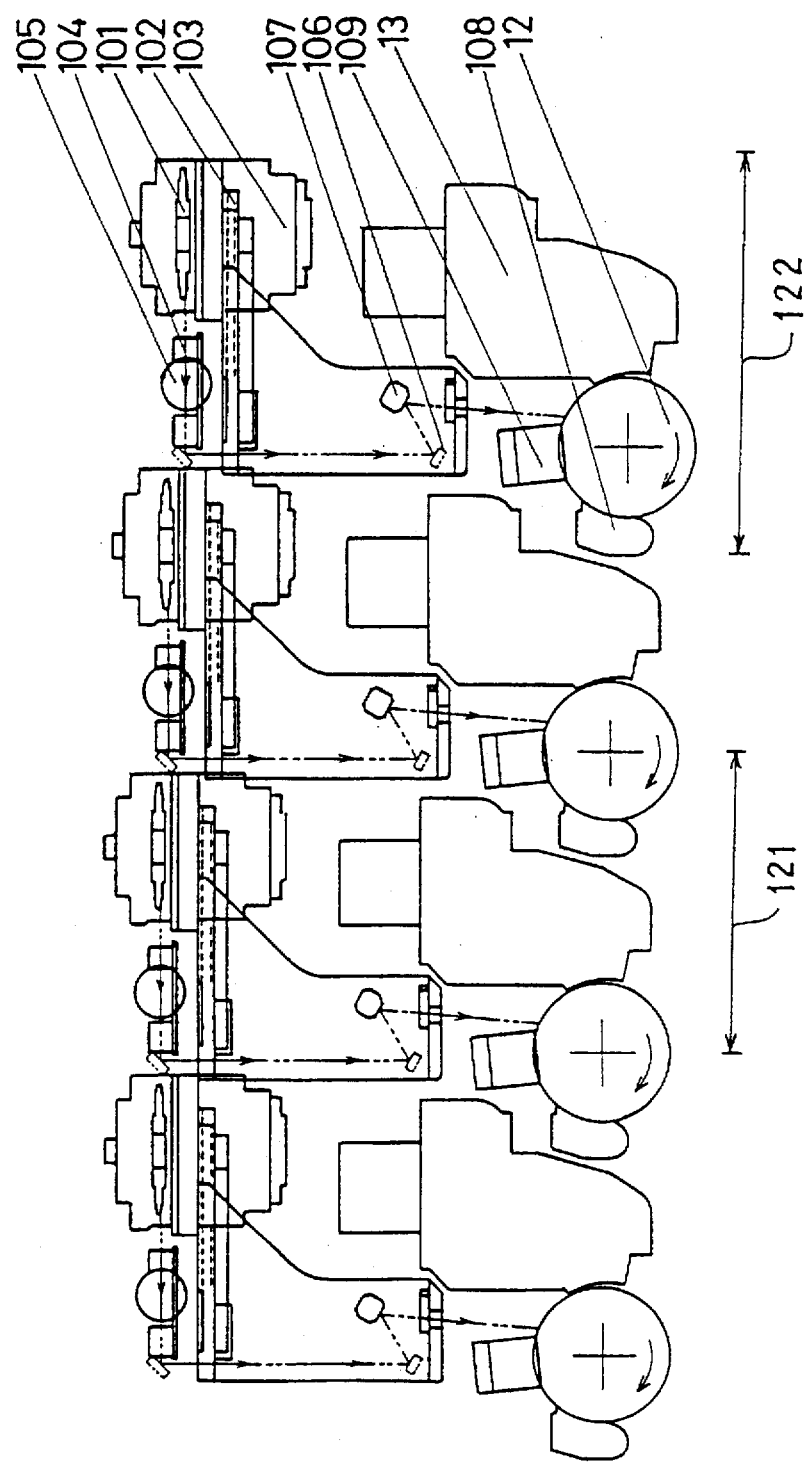
FIG. 2 is a view illustrating a basic structure of a color printing laser printer to which the present invention is applied.

FIG. 2 is an explanatory view showing a structure of a color printing laser printer to which the present invention is applied.

Referring to FIG. 2, reference numeral 101 designates a polygon mirror formed in an octagonal configuration having a mirror on each of the surfaces thereof, 102 an optical frame, 103 a DC motor for rotating a polygon mirror, 104 a fθ lens, 105 a laser diode and a collimator lens, 106 and 107 a return mirror, 108 a cleaner, and 109 a charger. Referring to FIG. 2, a n arrow designate s a irradiating direction of the laser beam. The motor 103 is capable of outputting a hole signal (FG signal) for rotation control once per rotation.

The image formation part which comprises a pair of light scanning parts 14 and the photosensitive drum 12 is constituted in the same manner as the conventional laser printer. In the color printing laser printer of the present invention, four sets of image formation parts are provided for three original colors; cyan, magenta, and yellow, plus black color. These four image formation parts are arranged in the order of transcription from the right side.

Figure 3:
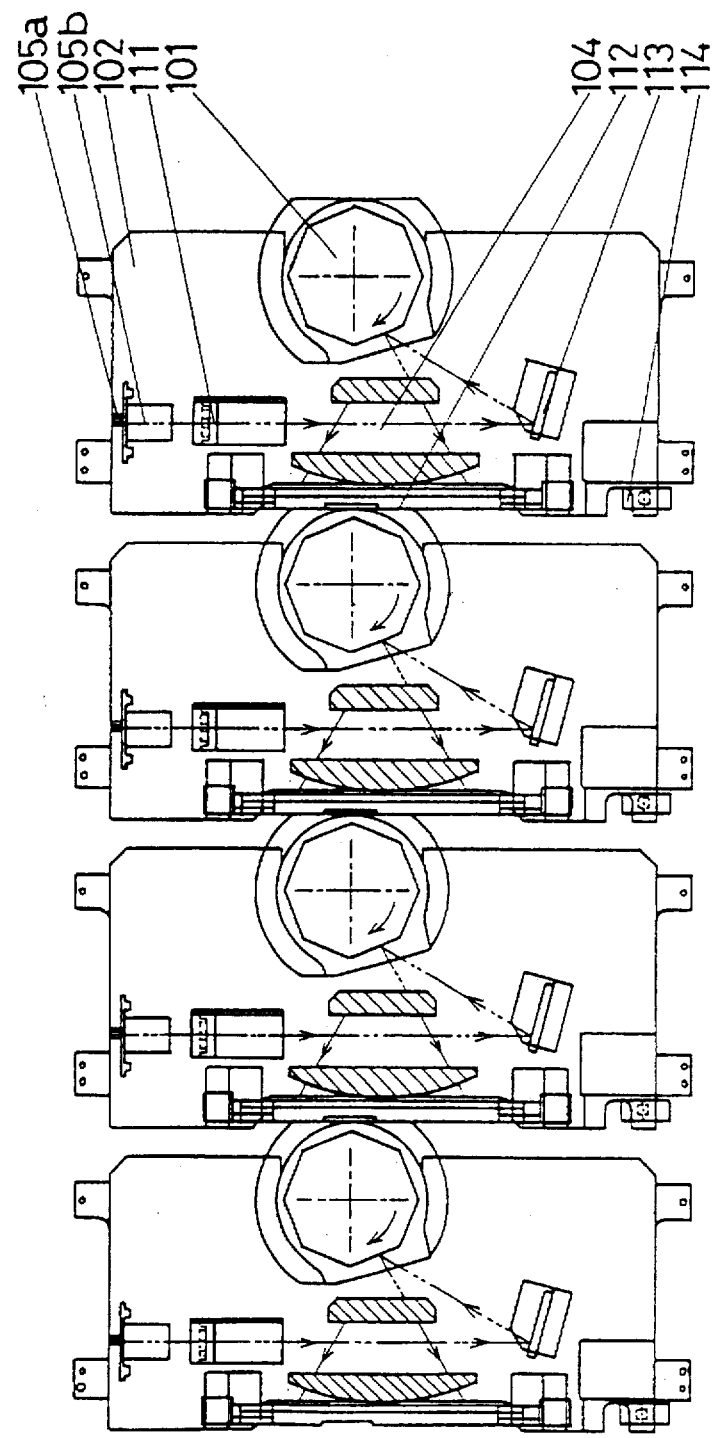
FIG. 3 is a view illustrating a structure of the color printing laser printer of FIG. 2 as viewed in a plane view.

FIG. 3 is an explanatory view illustrating a structure of the color printing laser printer of FIG. 2 as viewed in a plane view.

Referring to FIG. 3, reference numeral 105a designates a laser diode, 105b a collimator lens, 111 a cylindrical lens, 112 and 113 return mirrors and 114 a photodiode used as an optical sensor. Referring to FIG. 3, an arrow designates an irradiating direction of the laser beam.

FIG. 4 is a block diagram showing a structure of the clock controller 16. The clock controller 16 is a controller in which a light scanning control signal is given to each light scanning part 14 which serves as a timing signal for controlling the timing of the scanning laser beam. As shown in FIG. 4, the clock controller 16 has a master clock oscillator 17. The master clock oscillator 17 incorporates a crystal oscillator and outputs a. master clock signal generated from a single clock signal obtained from this crystal oscillator.

The clock controller 16 obtains an original signal and an edge signal described later by frequency dividing and edge detecting the master clock signal output from the master clock oscillator 17 with the frequency dividing and edge detecting circuit 18 to provide three signals; the master clock signal, the original signal and the edge signal to each light scanning parts 14 as light scanning timing control signals.

Incidentally, the clock controller 16 may be constituted so that the clock controller 16 does not incorporate the master clock oscillator 17 and receives the master clock signal from the outside.

Figure 5:
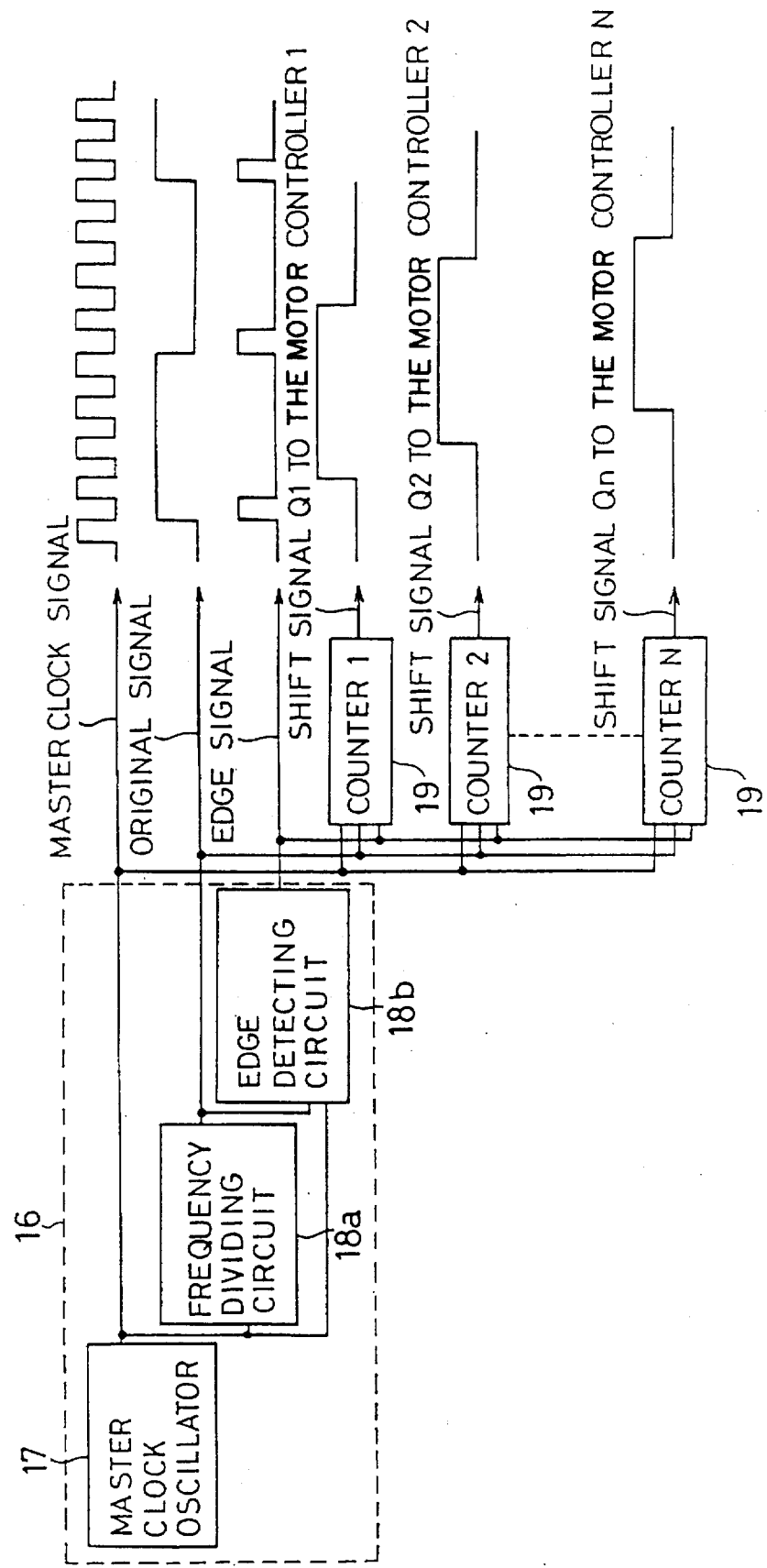
FIG. 5 is a timing chart showing the timing of the light scanning timing control signal according to the present invention.

FIG. 5 is a timing chart showing the timing of the light scanning timing control signal. Each signal will be explained on the basis of FIG. 5.

The clock controller 16 obtains the master clock signal MCLK from the master clock oscillator 17 as described above. In addition, the master clock signal MCLK is frequency divided into 1/N with the frequency dividing circuit 18a to obtain the original signal ORG. The edge detecting circuit 18b obtains an edge signal EDG of the original signal ORG from the master clock signal MCLK and the original signal ORG. The master clock signal MCLK, the original signal ORG and the edge signal EDG are transmitted to each of the light scanning parts 14 as the light scanning timing control signal.

Each of the light scanning parts 14 controls the timing of light scanning of the scanning laser beam by these signals given by the clock controller 16 as a light scanning timing control signal.

Each of the light scanning parts 14 provides one counter 19 so that a total of N counters are provided in total corresponding to N light scanning parts. In addition, as described later, N motor controllers are provided for controlling the motors 103 of the polygon mirrors. Corresponding to N motor controllers, N optical units are provided which output as the scanning laser beam by reflecting with the polygon mirror 101 the laser beam modulated in accordance with the image information for each original color.

The clock controller 16 offers the master clock signal MCLK, the original signal ORG, and the edge signal EDG to the counter 19 of each of the light scanning parts 14 as the timing signal of the light scanning parts.

In the counter 19 of each of the light scanning parts 14, a specific counter value $N_1, N_2, ---, N_n$ are set which correspond to the position of the image formed by the light scanning part 14. The original signal ORG is shifted from the edge signal EDG and is output as a shift signal Qn, to be transmitted to respective motor controller 1 through N. A shift amount of the shift signal Qn is an amount which multiply one cycle time of the master clock signal MCLK by a counter value Nn. In other words, when the count value is "1", the original signal ORG is shifted from the edge signal EDG by one pulse of the master clock signal MCLK. When the count value is "2", the original signal ORG is shifted by two pulses of the master clock signal MCLK to be output as the shift signal Qn which is transmitted to respective motor controller 1 through N.

In other words, the edge signal EDG is a signal which serves as a standard when the original signal ORG is shifted by the count value of the counter 19. The master clock signal MCLK is a signal which serves as a pitch of a shift amount when the original signal ORG is shifted. The shift cycle of the signal serves as one pitch of the shift amount. The shift signal Qn is a signal for controlling the rotation phase of the motor 103 incorporated in the polygon mirror 101 for each surface of the polygon mirror 101.

The shift amount of the shift signal Qn is set to adjust the position of the image formed by each of the light scanning parts 14. A voluntary shift amount can be set by setting the count value of the counter 19.

Consequently, the count value of each counter 19 is set from the outside. For example, when the count value of the counter 19 is either manually or automatically adjusted after printing operation at the time of shipment or at the time of usage, the shift in the image position can be easily adjusted in printing multicolored images.

In such a case, when the shift in image position is manually adjusted, the shift is evaluated either with the naked eyes or with loupe. On the basis of the evaluation, the count value in each of the counters 19 is manually corrected. In addition, when the shift in image is automatically adjusted, a color shift sensor is provided which detects the shift in color of a plural color images that have been printed so that the count value in each of the counters 19 is automatically corrected on the basis of the judgment of the color shift sensor.

With respect to the adjustment in the image position, the color shift can be finely adjusted when the pitch of the master clock signal MCLK is fine. For example, when one cycle of the master clock signal MCLK forms 1/128 cycle of the shift signal Qn, namely position shift of 1/128 of one dot. One cycle of the master clock signal MCLK forms 1/256 cycle of the shift signal Qn, even the position shift of 1/128 of one dot can be adjusted.

Figure 6:
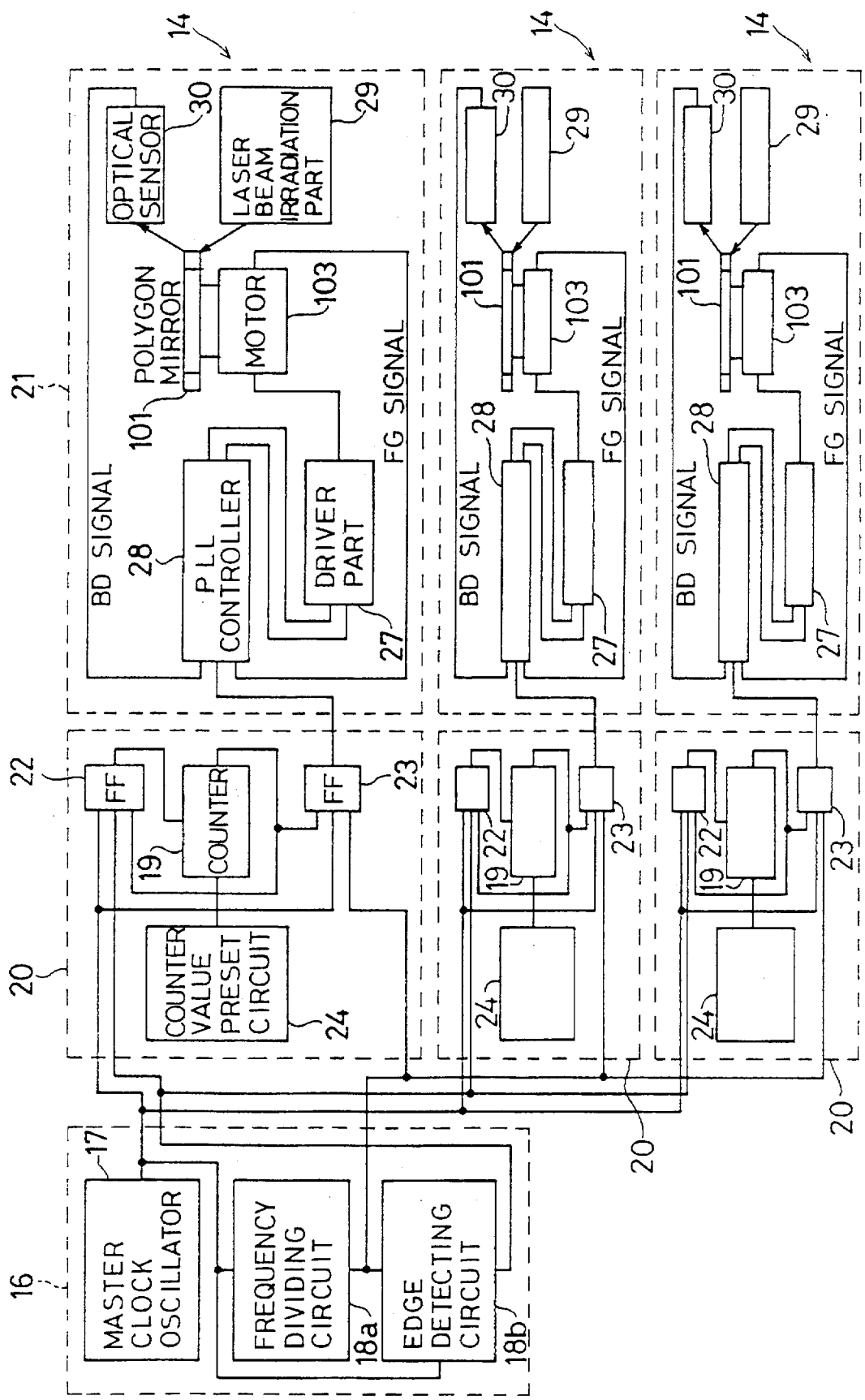
FIG. 6 is a block diagram showing a structure of a light scanning part according to the present invention.

FIG. 6 is a block diagram showing a structure of the light scanning part. The light scanning part 14 comprises a light scanning timing controller 20 and a motor controller 21.

The light scanning timing controller 20 comprises a counter 19, an FF (flip-flop) 22 for offering a signal to the counter 19, and an FF 23 for offering a shift signal Qn to the motor controller 21 and a counter value preset circuit 24 for presetting a value of the counter 19.

The motor controller 21 comprises an optical unit including a polygon mirror 101 and a motor 103, a driver part 27 for driving a motor 103, a PLL (phase locked loop) controller 28 for controlling the revolution of the motor 103 by offering a signal to the driver part 27, a laser beam irradiating part 29 for irradiating the polygon mirror 101 with a laser beam, and an optical sensor 30 for detecting the optical scanning laser beam reflected by the polygon mirror 101.

The signal detected by the optical sensor 30 is referred to as a signal synchronizing with the initiation of the scanning of the laser beam referred to as a BD (Beam Detect) signal. The BD signal is used as a writing out signal for the image information formed on each photosensitive drum 12.

The laser beam applied by the laser irradiating part 29 is modulated in accordance with the image information. The image information thus modulated is divided into image information which corresponds to each original color in the original plural color image information so that thus divided image information is respectively delayed in accordance with the transcription period of each photosensitive drum 12.

Figure 7:
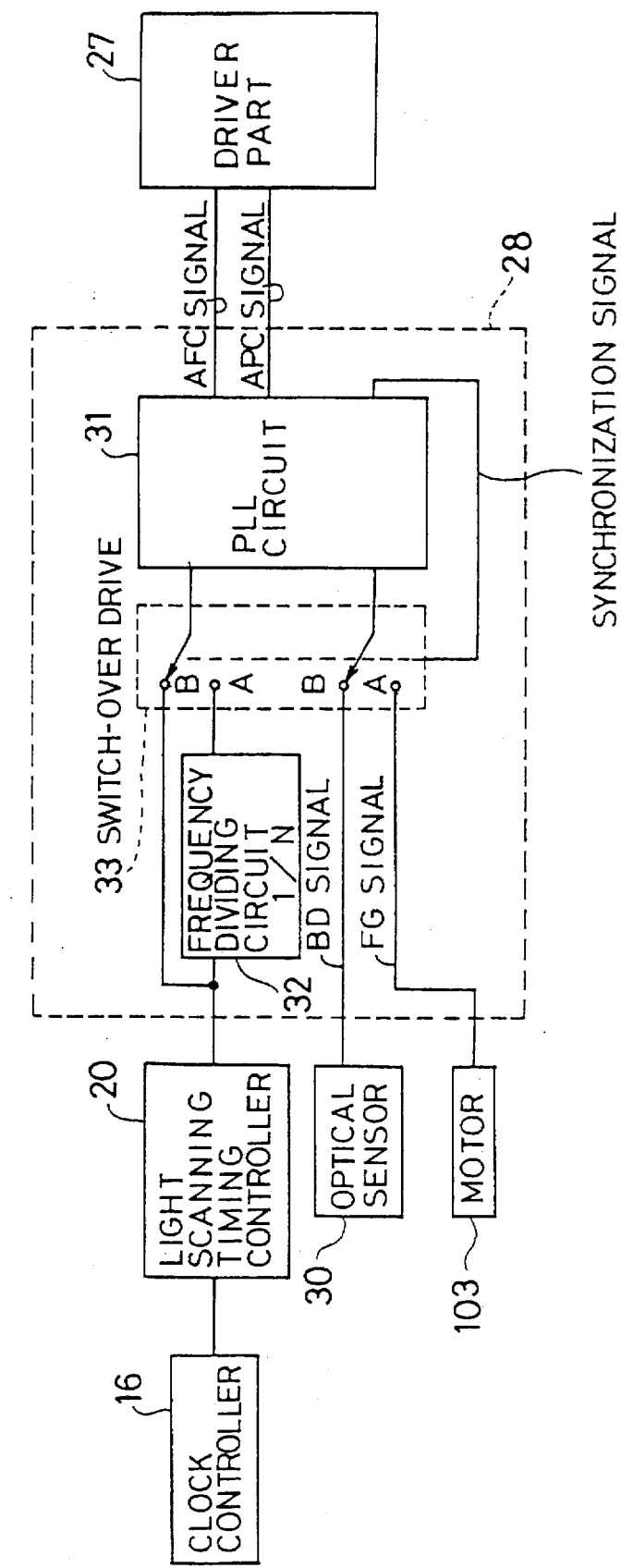
FIG. 7 is a block diagram showing a detailed structure of a PLL controller according to the present invention.

FIG. 7 is a block diagram showing a detailed structure of the PLL controller 28. The PLL controller 28 comprises a PLL circuit 31, a frequency dividing circuit 32 for obtaining a revolution number control signal by frequency dividing the shift signal Qn, and a switch-over device 33. The PLL circuit 31 obtains a FG pulse signal output once per one revolution from the motor 103 when the switch-over device 33 is set to the side A, compares the FG pulse signal with the revolution number control signal obtained by frequency dividing the shift signal by 1/N to control the revolution number of the motor 103 by offering the AFC (automatic frequency control) signal to the drive part corresponding to the difference between the shift signal and the revolution number control signal.

When the revolution number of the motor 103 agrees with the revolution number control signal, the PLL circuit 31 offers the synchronization signal (LOCK signal) to the switch-over device 33 to set the switch-over device 33 to the side B. This allows the PLL circuit 31 to obtain the BD signal detected for each one scan operation of the scanning laser beam from the optical sensor 30 to compare the BD signal with the shift signal Qn thereby controlling the revolution of the motor 103 by offering the APC (automatic phase control) signal to the driver portion 27 in accordance with the difference between the BD signal and the shift signal Qn.

The aforementioned revolution number control signal is obtained by frequency dividing the shift signal Qn by one surface of the polygon mirror 101. Consequently, in this particular embodiment, the revolution number control signal is obtained by frequency dividing the shift signal Qn by ⅛ because the polygon mirror has eight surfaces.

The driver portion 27 controls the revolution number and revolution phase of the motor 103 by controlling current and voltage on the basis of the AFC signal and APC signal.

Figure 8:
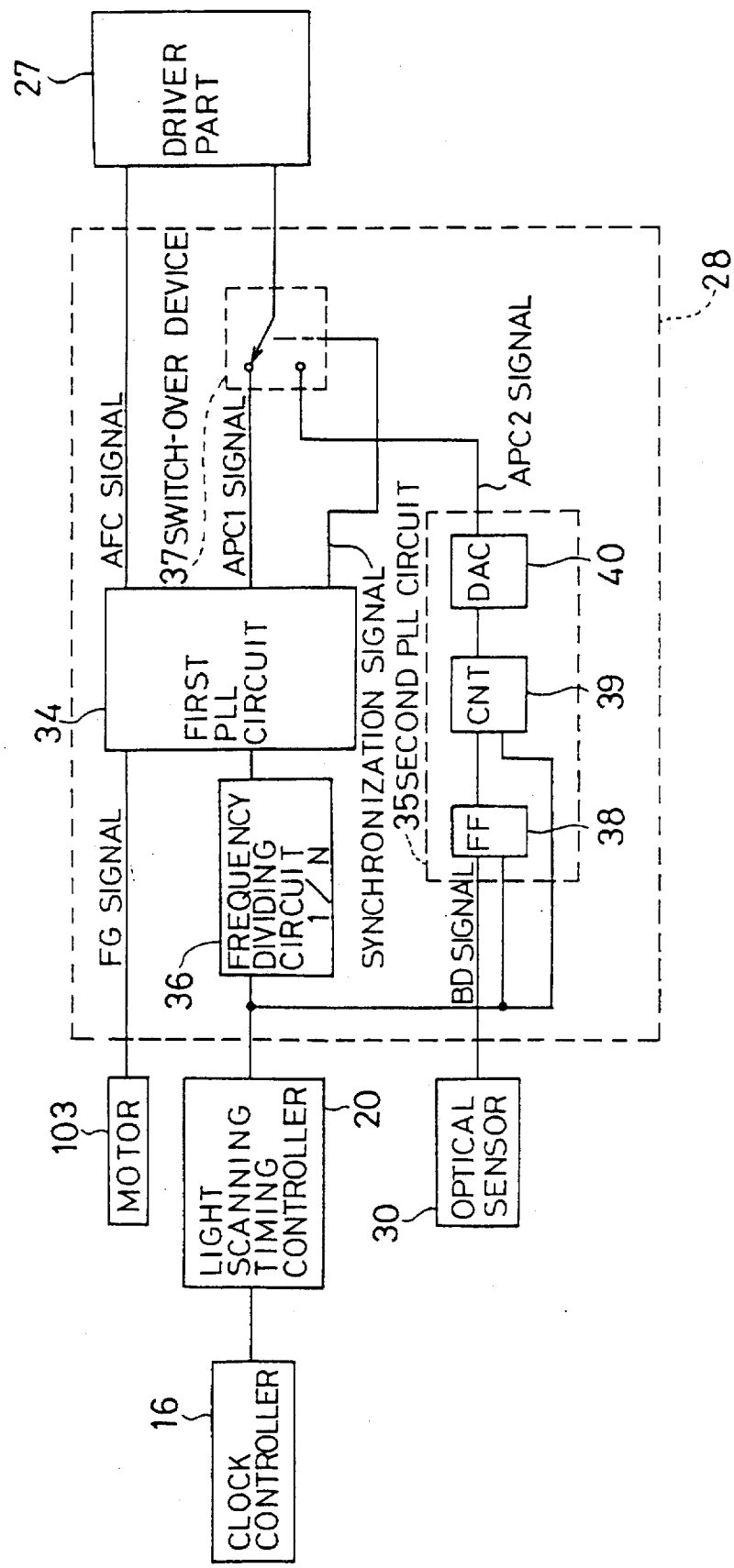
FIG. 8 is a block diagram showing a structure of another embodiment of a PLL controller according to the present invention.

FIG. 8 is a block diagram showing a structure of another embodiment of the PLL controller. In this embodiment, the PLL controller 28 comprises a first PLL circuit 34, a second PLL circuit 35, a frequency dividing circuit 36 obtained by frequency dividing the shift signal Qn into 1/N and a switch-over device 37.

The first PLL circuit 34 obtains the FG pulse signal output from the motor 103 once per one revolution when the switch-over device 37 is set to the side C. The hole signal is compared with the revolution number control signal obtained by frequency dividing the shift signal by 1/N to control the revolution number of the motor 103 by offering the AFC signal to the driver part 27. At the same time, the APC 1 signal for the control of the polygon mirror for each of the two surfaces is offered to the driver part 27.

The driver part 27, upon receipt of the two signals: the AFC signal and the APC 1 signal, synthesizes both signals by weighing them at a certain ratio to control the revolution number of the motor 103 with the synthesized signal.

When the revolution number of the motor 103 agrees with the revolution number control signal, the first PLL circuit 34 offers the synchronization signal (LOCK signal) to the switch-over device 37 to set the switch-over device 37 to the side D so that a signal from the second PLL circuit 35 is offered to the driver part 27.

The second PLL circuit 35 obtains from the optical sensor 30 the BD signal detected for each of one scanning operation of the scanning laser beam. The BD signal is compared with the shift signal Qn to control the revolution phase of the motor 103 by offering the APC 2 signal corresponding to the difference between the BD signal and the shift signal to the driver part 27. The second PLL circuit 35 comprises an FF 38, a counter (CNT) 39 and a DAC (D/A converter) 40.

Figure 9:
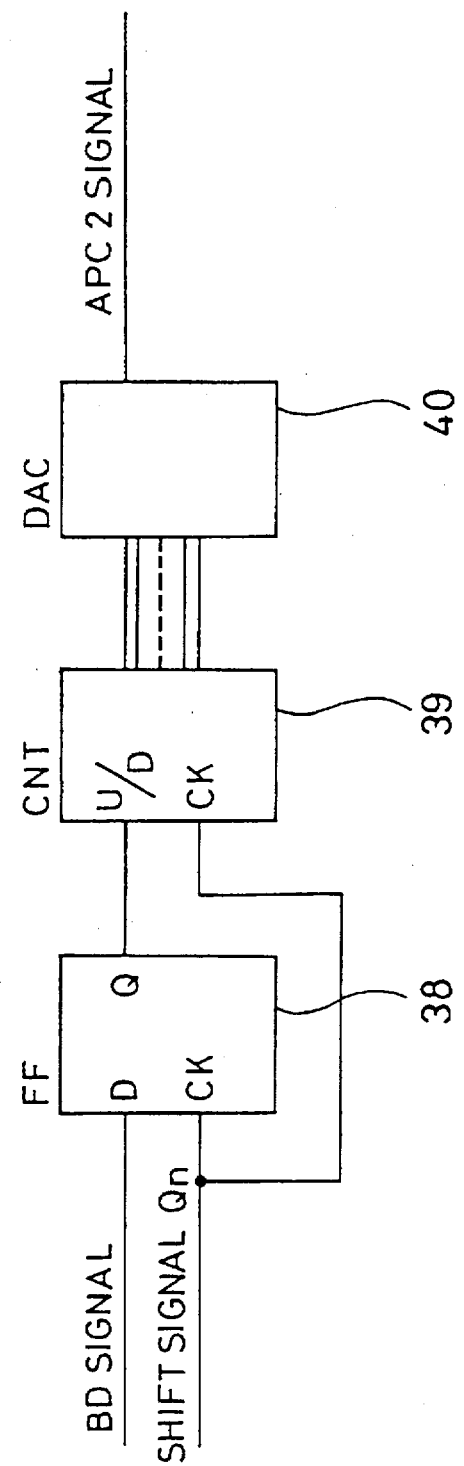
FIG. 9 is a block diagram showing a structure of a second PLL circuit according to the present invention.

FIG. 9 is a block diagram showing a structure of the second PLL circuit 35. FIG. 10 is a timing chart showing the timing of the signal of the second PLL circuit 35, the chart showing the shift signal Qn, the BD signal, the signal output from the Q terminal of the FF 35 as the FF (Q) signal.

As shown in FIGS. 9 and 10, the second PLL circuit 35 uses a D-type FF 38. The D-type FF 38 outputs an L-level signal from the terminal Q when the BD signal is delayed to the shift signal Qn while outputting an H-level signal when the BD signal precedes the shift signal Qn.

Either the L-level or the H-level signal is transmitted to an UP/DOWN terminal U/D in the CNT 39 to move either upward or downward the count value of the CNT 39. The DAC 40 places the output of the CNT 39 on the analog level to output the output of the CNT 39 as the APC 2 signal.

In other words, when the FF (Q) signal is on the L-level, the up count raises the output level of the APC 2 signal. When the FF (Q) signal is on the H-level, the down count lowers the output level of the kPC 2 signal.

In any PLL controller 28 shown in FIGS. 7 and 8, the revolution of the motor 103 is controlled with the PLL. When the revolution number assumes a value in the scope of ±5% of the normal revolution number, a synchronous signal is output to switch over the PLL input.

In other words, when the revolution number is present outside the scope of ±5% of the normal revolution number, the referenced signal is a revolution number control signal (one pulse/one revolution) obtained by 1/N frequency dividing the shift signal Qn. In this case, the controlled signal is an FG signal (one pulse/one revolution) from the motor 103 which controls the revolution number of the motor 103, namely a rough control of the motor 103.

On the other hand, when the revolution number is present inside the scope of ±5% of the normal revolution number, the referenced signal is the shift signal Qn (one pulse/one scan). In this case, the controlled signal is an output signal (one pulse/one scan) of the optical sensor 30 which controls the revolution phase of the motor 103, namely a fine control of the motor 103.

The two-stage adjustment allows a highly accurate adjustment of the revolution phase (one mirror surface unit) of the polygon mirror 101 on the basis of the light scanning timing control signal obtained from the clock controller 16 thereby enabling an exact adjustment of the position of the image formed by each light scanning part 14.

The color printing laser printer is constituted as shown in FIGS. 2 and 3. In other words, the optical unit is formed in a reverse L-shaped configuration. Then a recessed portion is formed on the optical frame 102 which accommodates an optical unit. Besides, since part of the other optical unit is telescopically arranged in the recessed portion, the process pitch generated when the paper is conveyed From the photosensitive drum 12 to the subsequent photosensitive drum 12 can be reduced in size to a level smaller than one process module 122 of the optical unit.

Incidentally, in this particular embodiment, the optical unit may be formed in an approximately reverse L-shaped configuration, but the optical unit may be formed in an approximately L-shaped configuration.

FIG. 11 is an explanatory view showing another example of the structure of the color printing laser printer to which the present invention is applied, the view showing a top view thereof.

In this example, since the rotation shaft of the polygon mirror 101 is arranged approximately in parallel relative to the direction in which the paper is conveyed, one process module in the optical unit 122 can be reduced in size to a level smaller than the process pitch 121 generated when the paper is conveyed from the photosensitive drum 12 to the subsequent photosensitive drum 12.

In this manner, the same signal can be transmitted to each motor 103 in the same delay time by obtaining the light scanning timing control signal provided to each light scanning part 14 from the single clock signal. This eliminates a shift generated between polygon mirrors in each light scanning part 14 in the laser beam scanning operation for each of the original colors. In addition, since the revolution phase of the polygon mirror 101 can be controlled with an accuracy finer than one scan of the laser beam, the position of images for each of the original colors formed by the laser beam scanning operation of each of the light scanning parts 14 can be accurately matched.

In accordance with the present invention, a timing signal is generated by using a single master clock signal obtained by the master clock oscillator to control the timing of the scanning laser beam in each of the light scanning parts. When the standard for the position of images formed by each light scanning part 14 is matched to each other, the image position can be accurately adjusted. Hence, when the apparatus of the present invention is incorporated in the color laser printer, the rotation of the polygon mirror can be highly accurately controlled thereby actualizing a clear color print free from printing patterns and color shift.

What is claimed is:

1. An image forming apparatus with a plurality of image forming units comprising:

a plurality of photoconductors;

a plurality of light scanning parts, each of which is correspondingly arranged to each of the photoconductors for forming a latent image on the photoconductors by irradiating the photoconductors with a scanning laser beam;

a master clock oscillator for generating a single clock signal; and a clock controller, common to the plurality of light scanning parts, for generating a timing signal by using the single clock signal obtained from the master clock oscillator and for transmitting the timing signal to each of the light scanning parts, each of the light scanning parts including a motor controller and a light scanning controller, the motor controller having a laser beam irradiating part for irradiating the photoconductors with a laser beam, a polygon mirror for scanning the photoconductors with the laser beam by reflecting the laser beam from the laser beam irradiating part, and a motor for rotating the polygon mirror, the light scanning timing controller receiving the timing signal from the clock controller to control a rotation of the motor in the motor controller based on the received timing signal, wherein the light scanning timing controller has means for varying a phase of the timing signal received from the clock controller, thereby varying a revolution phase of the polygon mirror in the motor controller.

2. An image forming apparatus according to claim 1, wherein the light scanning timing controller further comprises means for storing a phase value to be varied and varies the phase of the timing signal based on the phase value thus stored, thereby adjusting a position of the latent image formed on the photoconductor.

3. An image forming apparatus according to claim 1 wherein the light scanning timing controller has a counter, sets a counter value of each counter in accordance with a position of the latent image formed on the photo conductor in the control of the timing of the scanning laser beam, and obtains a shift signal by shifting the original signal obtained from the clock controller from the edge signal by the counter value, thereby controlling the revolution phase of the polygon mirror in each motor controller on a basis of the shift signal.

4. A light scanning controller according to claim 1 wherein the motor controller has an optical sensor detecting the scanning laser beam reflected by the polygon mirror, and a signal detected by the optical sensor is used as a writing signal for forming the latent images on each of the plurality of the photoconductors and as a signal for controlling the revolution phase of the polygon mirror.

5. A light scanning controller according to claim 4 wherein the motor controller includes a means for controlling the revolution number of the motor and a means for controlling the revolution phase of the motor.

6. A light scanning controller according to claim 5 wherein the motor for the polygon mirror comprises a motor outputting an FG pulse signal for revolution control, and each of the light scanning parts compares the FG pulse signal obtained from the motor with a revolution number control signal obtained by a frequency dividing of the shift signal to synchronize the revolution number of the motor with the revolution number control signal, followed by comparing a signal of the scanning laser beam detected by the optical sensor with the shift signal to synchronize the revolution phase of the motor with the shift signal.

7. A light scanning controller according to claim 5 wherein the motor for the polygon mirror comprises a motor outputting an FG pulse signal for revolution control, and each of the light scanning parts has one phase locked loop circuit to which either the shift signal or a revolution number control signal obtained by a frequency dividing of the shift signal is input in such a manner that the FG pulse signal obtained from the motor is input along with the input of the revolution number control signal to control the revolution number of the motor in accordance with a phase difference between these two signals whereas a signal of scanning light detected by the optical sensor is input along with the input of the shift signal to control the revolution phase of the motor in accordance with the phase difference between these two signals.

8. A light scanning controller according to claim 5 wherein the motor for the polygon mirror comprises a motor outputting an FG pulse signal for revolution control, and each of the light scanning parts has first and second PLL circuits so that a revolution number control signal obtained by a frequency dividing of the shift signal and the FG pulse signal obtained from the motor are input to the first PLL circuit to control the revolution number of the motor in accordance with a phase difference between the two signals whereas the shift signal and the light scanning signal detected by the optical sensor are input to the second PLL circuit to control the revolution phase of the motor in accordance with a phase difference between the two -signals.

9. A light scanning controller according to claim 8 wherein the second PLL circuit comprises a counter, a flip-flop and a digital/analog converter.

10. An apparatus according to claim 1 wherein an optical unit including the polygon mirror is formed in an approximately L-shaped or reverse L-shaped configuration, a recessed portion is formed on a frame of the optical unit, and part of the optical unit is telescopically arranged, whereby a process pitch is reduced in size which is generated when paper is conveyed from a photoconductor to a subsequent photoconductor, a size assuming a level smaller than one process module of the optical unit.

11. An apparatus according to claim 1 wherein, comprising an optical unit, the polygon mirror is arranged so that a revolution shaft of said polygon mirror is approximately in parallel with a direction in which paper is conveyed, whereby one process module of the optical unit is reduced in size to a level smaller than a process pitch generated when paper is conveyed from a photoconductor to a subsequent photoconductor.

* * * * *